United States Patent

Luckenbach

[11] 4,098,680
[45] * Jul. 4, 1978

[54] METHOD OF REGENERATING A CRACKING CATALYST

[75] Inventor: Edward C. Luckenbach, Mountainside, N.J.

[73] Assignee: Exxon Research & Engineering Co., Linden, N.J.

[*] Notice: The portion of the term of this patent subsequent to Feb. 1, 1994, has been disclaimed.

[21] Appl. No.: 753,269

[22] Filed: Dec. 22, 1976

Related U.S. Application Data

[63] Continuation-in-part of Ser. No. 538,738, Jan. 6, 1975, Pat. No. 4,006,075.

[51] Int. Cl.² ............................................. C10G 11/18
[52] U.S. Cl. .................... 208/164; 252/417; 252/419
[58] Field of Search ................. 208/164; 252/417, 419

[56] References Cited

U.S. PATENT DOCUMENTS

| | | | |
|---|---|---|---|
| 2,589,124 | 3/1952 | Packie | 208/164 |
| 3,012,962 | 12/1961 | Dygert | 208/164 |
| 3,410,793 | 11/1968 | Stranahan et al. | 208/164 |
| 3,629,097 | 12/1971 | Smith | 208/164 |
| 3,838,036 | 9/1974 | Stine et al. | 208/164 |
| 3,844,973 | 10/1974 | Stine et al. | 208/164 |
| 4,006,075 | 2/1977 | Luckenbach | 208/164 |

*Primary Examiner*—Herbert Levine
*Attorney, Agent, or Firm*—John W. Ditsler

[57] ABSTRACT

An improved method for regenerating a catalytic cracking catalyst which comprises the steps of (1) increasing the temperature of the regeneration zone dense phase catalyst bed to a desired level above that normally employed during the regeneration so as to accelerate the rate of carbon conversion, (2) reducing the coke make in the reaction zone while maintaining the elevated temperature obtained in step (1) so as to increase the oxygen concentration in said regeneration zone so as to establish low levels of carbon monoxide in the flue gas and (3) reducing the temperature of the regeneration zone dense phase catalyst bed below the elevated temperature obtained in steps (1) and (2) while maintaining low levels of carbon monoxide in the flue gas. According to this invention, the flue gas may contain less than 0.05 volume %, preferably less than 0.02 volume %, carbon monoxide and, as such, may be discharged directly to the atmosphere with no discernable effect upon ambient air quality.

17 Claims, 1 Drawing Figure

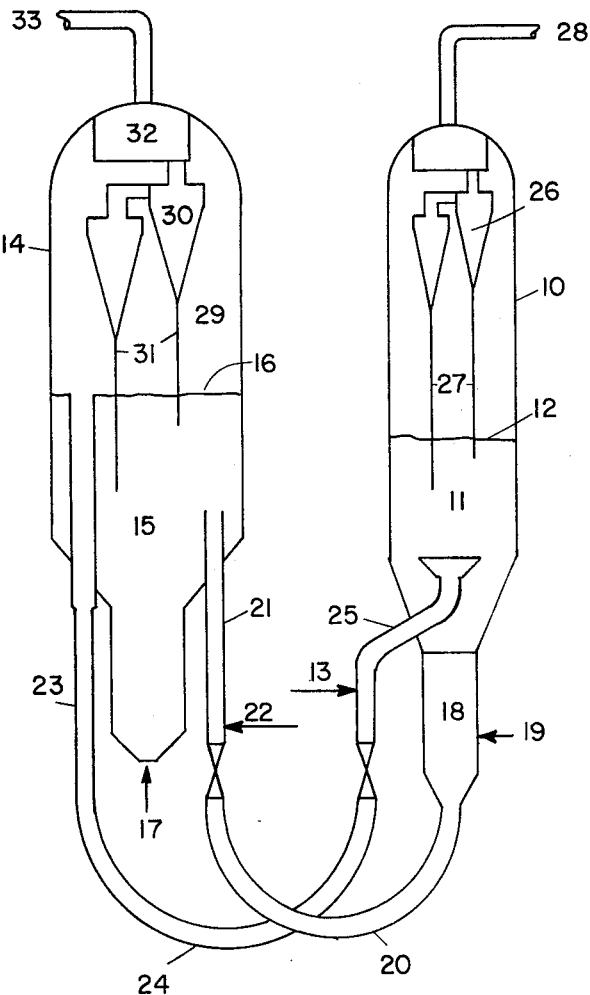

METHOD OF REGENERATING A CRACKING CATALYST

CROSS REFERENCE TO RELATED APPLICATIONS

This is a continuation-in-part of application Ser. No. 538,738, filed Jan. 6, 1975, now U.S. Pat. No. 4,006,075.

BACKGROUND OF THE INVENTION

1. Field of the Invention

The present invention relates to a method for regenerating catalyst employed in a fluid catalytic cracking process wherein a hydrocarbon is cracked catalytically in a reaction zone under cracking conditions with the concomitant deposition of non-volatile carbonaceous deposits, or coke, upon the catalyst. More specifically, the present invention is directed to a regeneration process wherein a regeneration flue gas is obtained which contains a reduced concentration of carbon monoxide. A regenerated catalyst having a reduced residual carbon content is also obtained. These results are achieved by regulating the amount of coke deposited on the catalyst in the reaction zone and by adjusting the catalyst circulation rate.

2. DESCRIPTION OF THE PRIOR ART

The fluidized catalytic cracking of hydrocarbons is well known in the prior art and may be accomplished in a variety of processes which employ fluidized solid techniques. Normally in such processes, suitably preheated, relatively high molecular weight hydrocarbon liquids and/or vapors are contacted with hot, finely-divided, solid catalyst particles either in a fluidized bed reaction zone or in an elongated riser reaction zone, and maintained at an elevated temperature in a fluidized state for a period of time sufficient to effect the desired degree of cracking to lower molecular weight hydrocarbons typical of those present in motor gasolines and distillate fuels.

During the cracking reaction, coke is deposited on the catalyst particles in the reaction zone thereby reducing the activity of the catalyst for cracking and the selectivity of the catalyst for producing gasoline blending stock. In order to restore a portion, preferably a major proportion, of activity to the coke contaminated or spent catalyst, the catalyst is transferred from the reaction zone into a regeneration zone wherein the catalyst is contacted with an oxygen-containing regeneration gas, such as air, under conditions sufficient to burn at least a portion, preferably a substantial portion, of the coke from the catalyst. The regenerated catalyst is subsequently withdrawn from the regeneration zone and reintroduced into the reaction zone for reaction with additional hydrocarbon feed. Commonly, spent catalyst from the reaction zone is passed therefrom to a stripping zone for removal of strippable hydrocarbons from the catalyst particles prior to transferring the catalyst to the regeneration zone.

Typical regeneration zones in the prior art comprise large vertical cylindrical vessels wherein the spent catalyst is maintained as a fluidized bed by the upward passage of an oxygen-containing regeneration gas. The fluidized catalyst forms a dense phase catalyst bed in the lower portion of the vessel and a dilute catalyst phase containing entrained catalyst particles above, with an interface existing between the two phases. Flue gas, which normally comprises gases arising from the combustion of the coke on the spent catalyst, inert gases such as nitrogen from air, any unconverted oxygen and entrained catalyst particles, is then passed from the dilute catalyst phase into solid-gas separation means within the regeneration zone to prevent excessive losses of the entrained catalyst particles. The catalyst particles separated from the flue gas are returned to the dense phase catalyst bed. A substantially catalyst-free flue gas may then be passed from the separation means to equipment downstream thereof, for example to a plenum chamber, or be discharged directly from the top of the regeneration zone. Cyclone separators are commonly used as separation means.

Catalysts commonly employed in the catalytic cracking process, for example amorphous silica-alumina, silica-alumina zeolitic molecular sieves, silica-alumina zeolitic molecular sieves ion exchanged with divalent metal ions, rare earth metals, etc., and mixtures thereof, are adversely affected by exposure to excessively high temperatures. More specifically, at excessively high temperatures, the structure of such catalytic cracking catalysts undergoes physical change, usually observable as a reduction in the surface area for those catalysts which do not contain zeolitic components. This loss of surface area results in a substantial decrease in catalytic activity. In the case of zeolitic catalysts, this physical change may be manifested as the loss of crystallinity with little change in surface area. However, the physical change does cause a large loss of activity which can be demonstrated in analytical catalyst test procedures. Consequently, it is preferable to maintain the catalyst employed in a fluidized catalytic cracking process at temperatures below which substantial physical change of the active catalyst sites occurs. It has been found that silica-alumina cracking catalysts such as those described above containing crystalline zeolites may be subjected to temperatures of up to 1500° F. without substantial damage to the physical structure of the catalyst. Thus according to the present invention, regeneration process variables may be adjusted to properly achieve the desired low residual carbon upon regenerated catalyst within the above temperature limitation.

The burning of coke deposits from the catalyst in the regeneration zone may be characterized in a simplified manner as the oxidation of carbon and represented by the following chemical equations:

$$C + O_2 \rightarrow CO_2 \quad (1)$$

$$2C + O_2 \rightarrow 2CO \quad (2)$$

$$2CO + O_2 \rightarrow 2CO_2 \quad (3)$$

Reactions (1) and (2) both occur under typical catalyst regeneration conditions wherein the catalyst temperatures may range from about 1050° to about 1300° F. and are exemplary of gas-solid chemical interactions when regenerating catalyst at temperatures within this range. The effect of any increase in temperature is reflected in an increased rate of combustion of carbon and a more complete removal of coke from the catalyst particles. Gas phase reaction (3) is also accelerated by increased temperature as well as higher pressure and, particularly, the amount of oxygen present. Somewhat lower temperatures may be employed where an added carbon monoxide combustion catalyst or promoter is employed. The promoter may be incorporated into the catalyst or introduced into the regeneration zone separately. In addition to the above reactions which relate to the formation of carbon monoxide and carbon dioxide from carbon, water is formed from hydrogen in the coke.

It has been observed that reduced amounts of residual carbon upon a regenerated catalyst, particularly silica-alumina catalysts containing a crystalline alumino-silicate component which are often referred to as molecular sieve catalysts, results in both improved catalyst activity and catalyst selectivity for the conversion of hydrocarbons to the desired product or products. In the regeneration of catalytic cracking catalysts, particularly high activity molecular sieve type cracking catalysts, it is desirable to burn a substantial portion of the coke from the catalyst such that the residual carbon upon regenerated catalyst is very low, preferably less than about 0.1 wt. %. One difficulty which arises in regenerating catalyst to a low residual carbon level is that as the coke is burned with oxygen, it tends to produce substantial amounts of carbon monoxide which is subject to further oxidation into carbon dioxide as represented by reaction (3) above, a highly exothermic reaction. The use of an amount of oxygen theoretically sufficient to burn coke in the fluidized catalyst bed to a desired low level of residual coke upon regenerated catalyst has had the frequent undesirable effect of evolving a combustible mixture of oxygen and carbon monoxide in the dilute catalyst phase which may undergo the further combustion commonly referred to as "afterburning". (See "Oil and Gas Journal", Vol. 53 (No. 3), pp. 93–94, 1955 for further discussion). The "afterburning" causes a substantial increase in the temperature of the dilute catalyst phase which may exceed about 1500° F. Such high temperatures in the dilute catalyst phase can cause deactivation of the catalyst, thereby requiring additional catalyst replacement to the process in order to maintain a desired catalytic activity in the hydrocarbon reaction zone. Additionally, these high temperatures may cause damage to mechanical components of the regeneration zone, particularly in that portion of the regeneration zone in contact with the substantially catalyst-free flue gas wherein the temperature may increase to 1800° F. or greater. Such excessive temperatures in the substantially catalyst-free flue gas occur when reaction (3) does not proceed at a sufficient rate in the dense bed phase and in the dilute catalyst phase such that said flue gas contains an excess of oxygen and carbon monoxide so as to cause afterburning to be initiated. Reaction (3) then proceeds rapidly within the substantially catalyst-free flue gas since there is very little entrained catalyst present to absorb the heat released, and thereby reduce the rise in temperature. Thus, in that portion of the regeneration zone wherein the flue gas is substantially catalyst-free, there will occur a rapidly accelerating rise in temperature due to the heat released as complete combustion of carbon monoxide occurs or as the available oxygen is utilized, in the absence of any means to moderate the temperature therein.

Several methods have been proposed to overcome undesirable afterburning in that portion of the regeneration zone containing the substantially catalyst-free flue gas. One method used in industry is to control the oxygen-containing gas stream entering the regeneration zone directly responsive to a predetermined temperature differential between the outlet of the dilute catalyst phase and the dense bed of the regeneration zone in order to minimize excess oxygen therein. This practice eliminates excessive temperatures in that portion of the regeneration zone in contact with the substantially catalyst-free flue gas and produces a small amount of oxygen in said flue gas, generally less than about 0.5 vol %. However, this procedure has limited effect in attaining low levels of residual carbon on regenerated catalyst at conventional fluid catalytic cracker operating conditions wherein the dense phase bed temperature ranges from about 1050° to about 1250° F. and the amount of uncombusted carbon monoxide ranges from about 6 – 12 vol. %. (See for example U.S. Pat. No. 3,206,393).

When catalyst regeneration is carried out to obtain a regenerated catalyst with low residual carbon content and a low carbon monoxide level in the flue gas, therein have been, in general, three approaches suggested to overcome excessively high temperatures in the dilute catalyst phase. In one approach, a cooling medium which may comprise steam, liquid water, unregenerated catalyst, hydrocarbon oil, flue gas, etc. is injected to cool the dilute catalyst phase below a temperature which will cause damage to the catalyst or to mechanical members of the regeneration zone (see for example U.S. Pat. Nos. 2,393,839, 2,454,373 and 2,580,827). Another approach is to employ series catalyst regeneration wherein the catalyst to be regenerated is contacted in a plurality of dense phase regeneration zones with an oxygen-containing regeneration gas in which the catalyst flows from zone to zone, the temperature in each zone not exceeding a temperature at which excessive afterburning will occur. (See for example U.S. Pat. Nos. 2,788,311, 3,494,858, and 3,563,911). The third approach involves the use of indirect heat exchange, such as steam generation coils in the dense phase bed. When such methods are employed in conventional fluid catalytic cracker operations, the amount of carbon monoxide present in the flue gas may still be substantial, generally being in the range of from 6 – 12 vol. %. In addition, the above methods result in the loss of recoverable heat from the process or require expenditures for the use of additional equipment.

More recently, several published foreign patent applications making claim to priority applications filed in the United States have suggested reducing the levels of both residual carbon on regenerated catalyst and emissions of carbon monoxide by operating the dense phase bed in the regeneration zone at elevated temperature, that is, temperatures ranging from about 1250° to about 1400° F. These high dense bed temperatures can result in substantial afterburning in the dilute catalyst phase and may be prevented by techniques similar to and having the same disadvantages as those mentioned above. As an example, published Netherlands application 72,15798 discloses a two-stage process for regenerating fluid catalytic cracking catalysts at elevated temperatures, thereby favoring substantially complete combustion of carbon monoxide, with a provision for recovering the heat evolved in the dilute catalyst phase by the use of a circulating stream of partially regenerated catalyst.

As another example, U.S. Pat. No. 3,844,973 and Netherlands application 73,07445 disclose a regeneration zone which comprises a first dense bed, a dilute phase transport riser, and a second dense bed. The carbonaceous deposits are oxidized in the first dense bed to produce a partially spent regeneration gas containing carbon monoxide and a regenerated catalyst. The regeneration gas and regenerated catalyst are then passed to a dilute phase transport riser wherein, preferably, carbon monoxide is combusted to carbon dioxide, with the regenerated catalyst being passed to the second dense bed from which it is returned to the reaction zone. Thus the oxidation of both carbon monoxide and coke occur within the same regeneration zone but, preferably, at different locations. The application also discloses control of the temperature of the regenerated catalyst returning to the reaction zone independently of the coke oxidation and as another variation, control of the coke on spent catalyst to a predetermined residual level by adjusting the regeneration gas rate to the first dense bed.

Other published foreign patent applications based on U.S. applications relate to controlling the oxidation of carbon monoxide to carbon dioxide in the dense bed phase by regulating the oxygen rates passing into the regeneration zone in order to reduce the level of coke on regenerated catalyst leaving the regeneration zone and to minimize, if not totally eliminate, afterburning occurring within the regeneration zone. (See for example German application 2,327,209 and Netherlands application 73,09759). However, for a commercially operating fluid catalytic cracking unit, any appreciable increase in regeneration gas rate might require additional blower or compressor capacity, thereby necessitating an added expenditure. In addition, although the low residual carbon on regenerated catalyst and the low carbon monoxide level in the flue gas can be maintained by adjusting the regeneration gas rate and hence the oxygen concentration in the regeneration zone, this method has the disadvantage of involving the interaction of several process variables. For example, changes in the regeneration gas rate, while maintaining the excess oxygen in the regeneration zone at a constant level, will result in a directly proportional heat release in said zone. The differential heat evolved will cause a change in the dense phase bed temperature which in turn must be compensated for by adjusting the catalyst circulation rate. This changes the temperature in the reaction zone which in turn causes a variation in the coke make which requires complicated secondary corrective measures.

Thus, in view of the disadvantages of the foregoing prior art, it would appear desirable to have a method of reducing the residual carbon on regenerated catalyst and the carbon monoxide content in the flue gas to desirable low levels in the absence of excessive afterburning in that portion of the regeneration zone occupied by substantially catalyst-free flue gas. It would also be desirable to be able to practice such a method in said portion of the regeneration zone of a conventional fluid catalytic cracking unit wherein the carbon monoxide and oxygen content of the flue gas ranges from about 6 – 12 vol. % and 0.1 – 0.8 vol. %, respectively, without the need to regulate the regeneration gas rate, employ extraneous cooling means, or use a multi-stage regeneration zone to reduce the temperature therein and thus inhibit afterburning.

SUMMARY OF THE INVENTION

Now according to the present invention, these and other disadvantages of the prior art have been overcome by providing a method for regenerating a coke contaminated cracking catalyst at a substantially constant regeneration gas rate, thereby enabling the carbon level on regenerated catalyst to be maintained at a low level while providing a flue gas having a very low carbon monoxide content in the absence of excessive afterburning in that portion of the regeneration zone wherein the flue gas is substantially catalyst-free.

The process of the present invention comprises contacting a dense phase fluidized bed of coke contaminated catalyst in a regeneration zone according to the steps of:

(1) increasing the temperature of the dense phase catalyst bed to a desired level above that normally employed in the regeneration zone so as to increase the rate of conversion of coke to carbon monoxide and carbon dioxide;

(2) reducing the coke make in the reaction zone for a time sufficient to effect an increased oxygen concentration in the regeneration zone to burn at least an additional portion of coke from the coke-contaminated catalyst to obtain a substantially catalyst-free flue gas containing less than about 0.5 vol. % carbon monoxide; and (3) reducing the temperature of the dense phase catalyst bed below that obtained in step (2) in order to maintain the carbon monoxide content in said flue gas at no greater level than that obtained in step (2), steps (1), (2) and (3) being effected in the substantial absence of excessive afterburning in that portion of the regeneration zone wherein the flue gas is substantially catalyst-free.

According to the method of the present invention, an excess of oxygen relative to the coke to be burned is employed in steps (2) and (3), such that at least 0.1, preferably at least 0.4 vol. % of free oxygen is present in the substantially catalyst-free flue gas. The amount of free oxygen present is controlled by adjusting the coke make in the reaction zone. The variation of excess oxygen in the substantially catalyst-free flue gas permits control of the temperature therein, thereby avoiding variation of the oxygen-containing regeneration gas rate and the use of additional cooling means to overcome excessive temperatures due to afterburning.

An outstanding advantage of the present invention is in providing a procedure for obtaining low levels of residual carbon on regenerated catalyst and carbon monoxide content in the flue gas from a conventional fluid catalytic cracking operation in the absence of excessive afterburning in that portion of the regeneration zone wherein the flue gas is substantially catalyst-free. More particularly, by following the method of the present invention, temperatures in the dilute catalyst phase are controlled within a range below the temperatures at which the catalyst suffers substantial loss of activity. Similarly, temperatures in that portion of the regeneration zone in contact with the substantially catalyst-free flue gas may be maintained within a range below which the mechanical components of the regeneration zone are damaged or lose strength.

Yet another outstanding advantage of this invention lies in providing a regenerated catalyst having low residual carbon thereon, preferably less than 0.1 wt. %, and generally possessing enhanced activity and selectivity characteristics more closely associated with those of fresh cracking catalyst. Accordingly, higher conversions of feedstock and higher yields of desirable conversion products may be achieved. Also by following the method of the present invention, such catalyst regeneration may be accomplished without the need of additional cooling means in that portion of the regeneration zone in contact with the substantially catalyst-free flue gas. In addition, the carbon monoxide content of the substantially catalyst-free flue gas can be maintained at less than about 0.05 vol. %, preferably less than about 0.02 vol. %. This low level of carbon monoxide in the flue gas permits the direct release of effluent gases to the atmosphere while meeting present ambient air quality standards. This added advantage permits the elimination of capital expenditures otherwise required for installation of boilers for the combustion of carbon monoxide. The present invention has the additional advantage of allowing the catalyst to be regenerated in a single dense phase bed, although it may be applied to a regeneration zone having multiple beds. Further the method claimed herein may be employed during the start-up period or during normal operations.

BRIEF DESCRIPTION OF THE DRAWING

The single FIGURE is a diagramatic representation of one form of apparatus adapted for practicing the present invention and includes a reaction zone and a regeneration zone suitable for use in the catalytic cracking of hydrocarbons.

DETAILED DESCRIPTION OF THE DRAWING

Having thus described the invention in general terms, reference is now made to the single schematic drawing. It is to be understood that the drawing is shown only for the purpose of illustrating a typical fluid catalytic cracker configuration. Such details are included as are necessary for a clear understanding of how the present invention may be applied to said system. No intention is made to unduly limit the scope of the present invention to the particular configuration shown as other configurations are contemplated. Various items such as valves, pumps, compressors, steam lines, instrumentation and other process equipment and control means have been omitted therefrom for the sake of simplicity. Variations obvious to those having ordinary skill in the art of catalyst regeneration processes are included within the broad scope of the present invention.

Referring now to the drawing, the system illustrated includes a vertically arranged cylindrical reaction zone 10 containing a fluidized bed 11 of catalyst having a level indicated at 12, in which the hydrocarbon feedstock introduced at line 13 is undergoing catalytic cracking. Hydrocarbon gas and vapors passing upward through fluid bed 11 maintain the bed in a dense turbulent fluidized condition having the appearance of a boiling liquid. A separate regeneration zone 14 arranged at approximately the same level as reaction zone 10 contains a dense phase catalyst bed 15 having a level indicated at 16, which is undergoing regeneration to burn off coke deposits formed in the reaction zone during the cracking reaction. An oxygen-containing regeneration gas enters the regeneration zone 14 by line 17 and passes upward through the dense phase catalyst 15, maintaining it in a turbulent fluidized container similar to that present in the reaction zone 10.

Spent catalyst to be generated is withdrawn from reaction zone 10 and flows downward through stripping zone 18. A line 19 supplies stripping steam or other stripping gas into the bottom of the stripping zone. Catalyst withdrawn from the bottom of stripping zone 18 passes through U-bend 20 into the connecting vertical riser 21 which extends into the lower portion of the regeneration zone 14 and terminates within the dense phase catalyst bed 15. Air is added via 22 in a quantity sufficient to reduce the density of the catalyst flowing in riser 21, thus causing the catalyst to flow upward into the regeneration zone 14 by simple hydraulic balance.

Regenerated catalyst from the dense phase catalyst bed 15 in the regeneration zone 14 flows downward through standpipe 23 and passes through U-bend 24 into the reaction zone 10 by way of the transfer line 25, which joins U-bend 24 at the level of the oil injection line 13 above the U-bend. The hydrocarbon feedstock for the cracking process is injected into line 25 through line 13 to form an oil and catalyst mixture which is passed into the fluid bed 11 within the reaction zone 10. Product vapors containing entrained catalyst particles pass overhead from fluid bed 11 into a gas-solid separating means 26 wherein the entrained catalyst particles are separated therefrom and returned through diplegs 27 leading back into fluid bed 11. The product vapors are then conveyed through line 28 into the product recovery system.

In regeneration zone 14, flue gases formed during regeneration of the spent catalyst pass from the dense phase catalyst bed 15 into the dilute catalyst phase 29 along with entrained catalyst particles. The catalyst particles are separated from the flue gas by a suitable gas-solid separation means 30 and returned to the dense phase catalyst bed 15 via diplegs 31. The substantially catalyst-free flue gas then passes into a plenum chamber 32 prior to discharge from the regeneration zone 14 through line 33.

DETAILED DESCRIPTION OF THE INVENTION

The amount of residual carbon on regenerated catalyst has a significant influence on the conversion and product distribution obtained in the fluidized catalytic cracking of hydrocarbon feedstocks, particularly wherein high activity molecular sieve type cracking catalysts are employed. For example, at constant operating conditions and constant coke production, a decrease in the weight % carbon on regenerated sieve catalyst of from 0.35 to about 0.1 will give an increase in conversion of hydrocarbons, e.g. by as much as about 2.5 vol. %, the increase in coversion being accompanied by a decreased production of less valuable heavy fuel oil. Similarly it could be projected that a decrease in carbon on regenerated sieve catalyst from about 0.2 to about 0.05 wt. % may improve conversion by about 2 vol. % or more and improve gasoline yield by about 1.4 vol. %.

By using the method of the present invention, coke contaminated catalysts may be regenerated to a low residual carbon content, 0.2 wt. % or less, in a single dense phase regeneration zone at temperatures below about 1500° F. at a substantially constant regeneration gas rate. This may be accomplished by first increasing the temperature of the dense phase catalyst bed in the regeneration while maintaining the regeneration gas rate substantially constant. Typically, the temperature to which the dense phase catalyst bed is raised will range from about 1250° to about 1450° F., preferably from about 1250° to about 1400° F. The increased temperature accelerates the rate of carbon conversion according to reactions (1)and (2) above and establishes a lower equilibrium concentration of residual carbon on regenerated catalyst. The rate of conversion of CO to $CO_2$ according to reaction (3) is also increased. However, little if any such conversion will occur because there is not an excess of oxygen present. Thus, the first step is primarily interested in accelerating the rate at which a given amount of combustion takes place. As the temperature is raised, it may be necessary to coincidentally reduce the coke make in the reaction zone in an amount sufficient to prevent excessive or undesirable afterburning, i.e., the regeneration zone is operated so as to maintain approximately the same temperature difference between the dense phase bed and the inlet or outlet of the catalyst separation means as was present prior to effecting said temperature increase. In such a case, the reduction in coke make described hereinafter is, in reality, a further reduction in coke make.

The expression "excessive" or "undesirable afterburning" is meant to mean obtaining temperatures in the substantially catalyst-free flue gas system due to the combustion of carbon monoxide that exceed permissible catalyst deactivation, materials of construction limitations and the like. In general, undesirable or excessive afterburning corresponds to temperatures above 1450° F. Preferably, however, the temperature should be maintained below about 1420° F., more preferably below about 1400° F., to avoid the undesirable effects of excessive afterburning.

Once a suitable elevated temperature operation has been established, i.e., one at which excessive afterburning in that portion of the regeneration zone wherein the flue gas is substantially catalyst-free is substantially eliminated, the coke make in the reaction zone is reduced for a time sufficient to effect an increased oxygen concentration in the regeneration zone. This has the effect of providing an excess of oxygen-containing gas in the regeneration zone relative to the amount of coke on the coke contaminated catalyst, while maintaining the regeneration gas rate substantially constant, prior to obtaining a substantially catalyst-free flue gas and completing the conversion of carbon monoxide to carbon dioxide. The presence of the excess oxygen allows the combustion of carbon monoxide to carbon dioxide to occur in the dense phase catalyst bed and in that portion of the dilute catalyst phase wherein sufficient catalyst is present to absorb the heat released without the use of extraneous cooling means. Thus the carbon monoxide content in the substantially catalyst-free flue gas will be reduced because the carbon monoxide will be combusted to carbon dioxide prior to reaching that portion of the regeneration wherein the flue gas is substantially catalyst-free. Hence, there will be insufficient free oxygen reaching that portion of the regeneration zone wherein the flue gas is substantially catalyst-free to cause excessive afterburning therein.

If this carbon reduction were to be accomplished at regeneration zone dense phase bed temperatures below 1250° F. with catalysts not containing combustion promoters, oxygen would be freed in the dense phase bed. At such temperatures, the rate of combustion reactions is relatively slow compared to that at higher temperatures (e.g. between 1300° and 1400° F.) such that there is normally insufficient time for the freed oxygen to be consumed in the dense phase bed or the dilute catalyst phase of the regeneration zone. The oxygen will simply pass from the regeneration zone with carbon monoxide.

However, combustion will be proceeding at a rate in accord with the temperature that exists. Heat will be liberated which will raise the temperature of the reaction gases. This general condition will exist throughout the regeneration zone, but becomes quite significant at the cyclone outlet, i.e., that portion of the regeneration zone that is substantially catalyst free, since very little catalyst is present to absorb the heat. Thus, at this location, the temperature can increase to exceptionally high levels (e.g. 1800°-2000° F.) which would destroy the downstream equipment. This prevents attaining substantially complete combustion of the carbon monoxide in the flue gases leaving the regeneration zone at low dense phase bed temperatures (i.e., below 1250° F.) by merely increasing the regeneration gas rate or reducing the carbon make.

In contrast, however, if the dense phase bed temperature is first increased, the kinetic rate constants for combustion reactions (1)-(3) shown above are increased such that for a given regeneration gas rate, more of the oxygen can be consumed in the dense phase bed for combustion of carbon monoxide. The presence of the excess oxygen and the increased rate of conversion of CO to $CO_2$ at the elevated temperature allows the conversion of CO to $CO_2$ to occur in the dense phase catalyst bed and in the dilute catalyst phase (where sufficient catalyst is present to absorb the heat released without the use of extraneous cooling means) prior to reaching a portion of the regeneration zone wherein the flue gas is substantially catalyst-free.

Therefore, raising the temperature of the dense phase catalyst bed lowers the maximum temperature that the gases in the dilute catalyst phase (i.e., at the cyclone inlet) can obtain. As noted above, this effect is even more pronounced in that portion of the regeneration zone downstream of the cyclones where there is little if any catalyst entrainment to absorb the heat of combustion.

Following the establishment of a low residual carbon level on regenerated catalyst and a low carbon monoxide content in the substantially catalyst-free flue gas at an elevated temperature, the temperature of the dense phase catalyst bed is reduced to a level sufficient to maintain the substantially complete conversion of coke to carbon dioxide without excessive afterburning in that portion of the regeneration zone wherein the flue gas is substantially catalyst-free. The level of residual carbon on regenerated catalyst may be at least that obtained in step (2) since the temperature of step (3) is lower than step (2). However, additional oxygen could be added to the regeneration zone such that the level of residual carbon will be reduced below that obtained in step (2). The temperature reduction of the dense phase bed will range from about 10° to about 130° F., preferably from about 10° to about 100° F., more preferably 20° to about 100° F., most preferably about 40° to about 80° F., below the elevated temperature established in the first and second steps above. The reduced bed temperature favors a lower deactivation rate of the regenerated catalyst than that obtained at the higher temperatures.

The combustion of carbon monoxide to carbon dioxide will continue in the dense phase bed and dilute catalyst phase as the temperature is reduced, thereby maintaining a desirable low level of carbon monoxide in that portion of the regeneration zone wherein the flue gas is substantially catalyst-free. Any afterburning in the substantially catalyst-free flue gas will be minimal due to the low carbon monoxide content therein. While reducing the temperature of the dense phase bed, it may also be necessary to reduce the coke make in the reaction zone to a level sufficient to insure the substantially complete conversion of coke to carbon dioxide. This has the effect of continuing to maintain an excess of oxygen in that portion of the regeneration zone wherein the flue gas is substantially catalyst-free.

The coke make in the reaction zone may be controlled in any suitable manner such as by adjusting the temperature in the reaction zone or by varying the catalyst holdup in the reaction zone. Similarly, the temperature of the dense phase catalyst bed may be controlled in any convenient manner, for example, by decreasing the catalyst circulation rate to increase said dense bed temperature. Several alternate methods may also be used to raise the temperature of the dense phase bed. They include introducing torch oil into the dense bed of the regeneration zone where it is oxidized, increasing the feed preheat temperature while maintaining the temperature in the reaction zone substantially constant, preheating the regeneration gas, and using a feedstock in the reaction zone having a relatively high Conradson carbon content. Methods of controlling the coke make in the reaction zone and increasing the temperature of the dense phase bed in the regeneration zone, additional to those enumerated above, are contemplated and would be obvious to one skilled in the art.

Oxygen-containing regeneration gases which may be employed in the process of the present invention are those gases which contain molecular oxygen in admixture with a substantial portion of an inert diluent gas. Air is a particularly suitable regeneration gas. An additional gas which may be employed is air enriched with oxygen. Additionally, if desirable, steam may be added to the dense phase bed along with the regeneration gas or separately therefrom to provide additional inert diluents and/or fluidization gas. In order to obtain an adequately fluidized dense phase catalyst bed which has good heat transfer throughout the bed and which does not contain relatively dead spots wherein localized temperatures may exceed temperatures which cause damage to the catalyst, the specific vapor velocity of the regeneration gas may suitably be in the range of from about 0.8 to about 6.0 feet/sec, preferably from about 1.5 to about 4 feet/sec.

Suitable petroleum fractions for use in the present invention include naphthas, light gas oils, heavy gas oils, wide-cut gas oils, vacuum gas oils, kerosenes, decanted oils, residual fractions, reduced crude oils, cycle oils derived from any of these, as well as suitable fractions derived from shale oil kerogen, tar sands bitumen processing, synthetic oils, coal hydrogenation, and the like. Such fractions may be employed singly, separately in parallel reaction zones, or in any desired combination.

In general, any commercial catalytic cracking catalyst designed for high thermal stability would be suitable. Suitable catalysts for regeneration include those containing silica and/or alumina. Other refractory metal oxides such as magnesia or zirconia may be employed and are limited only by their ability to be effectively regenerated under the selected conditions. With particular regard to catalytic cracking, preferred catalysts include the combinations of silica and alumina, containing 10 to 50 wt. % alumina, and particularly their admixtures with molecular sieves or crystalline aluminosilicates. Admixtures of clay-extended almunias may also be employed. Such catalysts may be prepared in any suitable method such as by impregnation, milling, co-gelling, and the like, subject only to provision of the finished catalyst in a physical form capable of fluidization.

Suitable molecular sieves include both naturally occurring and synthetic aluminosilicate materials, such as faujasite, chabizite, X-type and Y-type aluminosilicate materials and ultra stable, large pore crystalline aluminosilicate materials. The fundamental structure of the molecular sieves comprises silicon and aluminum atoms that are tetrahedrally coordinated with four oxygen atoms. The valence charges (+3) of the aluminum atom are not balanced by the four coordinated oxygen atoms so that there is a net negative charge of the alumina tetrahedra. These charges are balanced by cations, generally sodium or potassium, interspersed within the structure. All or a portion of the cations can be replaced with hydrogen ions, aluminum ions or metal cations, rare earth, manganese, cobalt, zinc and other metals of Groups I through VIII of the Periodic Table. When admixed with for example, silica-alumina to provide a petroleum cracking catalyst, the molecular sieve content of the fresh finish catalyst particles is suitably within the range from 5–15 wt. %, preferably 8–10 wt. %. An equilibrium molecular sieve cracking catalyst may contain as little as about 1 wt. % crystalline material.

The terms "spent catalyst" or "coke contaminated catalyst" as used herein generally refer to catalyst which has passed through a reaction zone and which contains a sufficient quantity of coke thereon to cause activity loss, thereby requiring regeneration. Generally, the coke content of spent catalyst can vary anywhere from about 0.5 to about 5 wt. % or more. Typically, spent catalyst coke contents vary from about 0.5 to about 1.5 wt. %.

The spent catalyst from the reaction zone is usually passed to a stripping zone for removal of strippable hydrocarbon therefrom prior to discharge into the regeneration zone. The stripping zone is suitably maintained essentially at the reaction zone temperature which ranges from 850° to 1100° F. A preferred stripping gas is steam, although nitrogen, other inert gas or flue gas may be employed. The stripping gas is usually introduced at a pressure in the range of from 10 to 50 psig and effects substantially complete removal of volatile components from the spent conversion catalyst. Stripped spent catalyst particles enter the dense bed of the regeneration zone through suitable lines from the stripping zone. Entry may be from the top, bottom or from the side of the dense bed. Alternatively, the spent catalyst may be mixed with the regeneration gas after exiting from the reaction zone, said mixture being introduced to the bottom of the regeneration zone.

The term "coke make" as used herein refers to the coke content of deposits that leave the reaction zone on the spent catalyst. These deposits may be graphitic in nature or hydrocarbon components of low hydrogen content. The hydrocarbon components comprise heavy molecular weight components of the feedstock, condensation products from the cracking reaction or unstripped light materials which were not removed completely in the stripping zone.

As in the prior art, the regeneration zone employed in the present invention normally comprises vertical cylindrical vessels wherein the catalyst to be regenerated is maintained as fluidized bed by the upward passage of an oxygen-containing regeneration gas thereby forming a dense phase catalyst bed and a dilute catalyst phase with an interface in between. The dense phase bed, which is usually located in the lower portion of the regeneration zone, is maintained at a temperature in the range of from about 1150°–1250° F. preferably from about 1200°–1250° F. The density of the dense phase bed may range from about 8 to about 30 lb./cu. ft.

The dilute catalyst phase is the primarily gaseous phase volume located above the dense phase bed within the regeneration zone. Specifically, the dilute phase contains relatively small quantities of catalyst compared to the dense phase bed. For example, the density of the dilute phase zone ranges from about 0.1 to about 1.0 lb./cu. ft. at the inlet to the separation means and from about 1 to about 5 lb./cu. ft. near the interface between the dense bed phase and the dilute catalyst phase. In many instances, the overall flow in the dilute phase is a concurrent flow of catalyst entrained with flue gases. It is contemplated that the dilute catalyst phase can include substantial quantities of the dense bed material which passes into that phase from excessive agitation or bubbling of gaseous materials through the dense bed. In general, the temperature in the dilute catalyst phase is at least that in the dense bed phase and is advantageously maintained within the range from about 1250° to about 1450° F., preferably 1420° F., preferably from about 1260° to about 1420° F., more preferably from about 1270° to about 1400° F., and most preferably from about 1270° to about 1370° F.

The term "substantially catalyst-free flue gas" is the gaseous phase volume located within or downstream of the catalyst separation means within the regeneration zone. Specifically, the "substantially catalyst-free flue gas" comprises flue gas from the dilute catalyst phase from which entrained catalyst particles have been substantially removed. This corresponds to the gaseous effluent from the separation means within the regeneration zone wherein the concentration of entrained catalyst particles will be less than about 1 preferably less than about 0.2 grains per actual cubic foot. The term "actual cubic foot" refers to the volume measured at actual operating conditions without correction to a standard temperature and pressure. The substantially catalyst-free flue gas from the separation means may be discharged to a variety of downstream equipment such as a dispersion means to redistribute the flue gas, stack valves, a plenum chamber and the like, prior to leaving the regeneration zone. By the use of the method of the present invention, substantial afterburning, and hence excessive temperatures in that portion of the regeneration zone wherein the flue gas is substantially catalyst-free, may be avoided. The temperature in that portion of said regeneration zone is maintained at least equal to that of the dilute catalyst phase at the inlet to the separation devices but no more than 50° F., preferably no more than 30° F. and most preferably no more than 20° F. above that at said inlet. Although not necessary to the practice of the present invention, extraneous cooling means such as steam may be employed to further reduce the temperature and thereby inhibit the afterburning reaction in that portion of the regeneration zone wherein the flue gas is substantially catalyst-free.

One or more gas-solids separation means may be utilized in the dilute catalyst phase to separate entrained regenerated catalyst particles from the regeneration gas. Preferred separation means will be cyclone separators, multiclones or the like whose design and construction are well known in the art. In the case of cyclone separators, a single cyclone may be used, but preferably, more than one cyclone will be used in parallel or in series flow to effect the desired degree of separation.

The construction of the regeneration zone can be made with any material sufficiently able to withstand the relatively high temperatures involved when afterburning is encountered within the vessel and the high attrition conditions which are inherent in systems wherein fluidized catalyst is regenerated and transported. Specifically, metals are contemplated which may or may not be lined. More specifically, ceramic liners are contemplated within any and all portions of the regeneration zone together with alloy use and structural designs in order to withstand temperatures of about 1400° F. and, for reasonably short periods of time, temperatures which may be as high as 1800° F.

The pressure in the regeneration zone is usually maintained in a range from about atmospheric to about 50 psig., preferably from about 10 to 50 psig. It is preferred, however, to design the regeneration zone to withstand pressures of up to about 100 psig. Operation of the regeneration zone at increased pressure has the effect of promoting the conversion of carbon monoxide to carbon dioxide and reducing the temperature level within the dense bed phase at which the substantially complete combustion of carbon monoxide can be accomplished. The higher pressure also lowers the equilibrium level of carbon on regenerated catalyst at a given regeneration temperature.

The residence time of the spent catalyst in the regeneration zone is not critical. In general, it can vary from about 1 to about 6 minutes. Typically it can vary from about 2 to about 4 minutes. The contact time or residence time of the flue gas in the dilute catalyst phase establishes the extent to which the combustion reaction can reach equilibrium. The residence time of the flue gas may vary from about 10 to about 60 seconds in the regeneration zone and from about 2 to about 15 seconds in the dense bed phase. Preferably, the residence time of the flue gas varies from about 15 to about 20 seconds in the regeneration zone and from about 6 to about 10 seconds in the dense bed.

A benefit derived from this regeneration process is that the regenerated catalyst leaving the regeneration zone has a very low residual carbon content, for example less than 0.2 wt. % and preferably less than 0.1 wt. %. As used in this specification, regenerated catalyst is catalyst leaving the regeneration zone which has contacted an oxygen-containing gas causing at least a portion, preferably a substantial portion, of the coke present on the catalyst to be removed. More specifically, the carbon content of the regenerated catalyst can vary anywhere from about 0.01 to about 0.2 wt. %, preferably from about 0.01 to about 0.1, more preferably 0.01 to about 0.05 wt. %, and most preferably from about 0.01 to about 0.03 wt. %.

Another benefit from this novel regeneration process relates to the unusually low carbon monoxide content of the effluent gas stream from the regeneration zone. Whereas flue gas from a conventional regeneration of cracking catalyst usually contains from about 6–12% carbon monoxide, a similar amount of carbon dioxide and relatively little oxygen (0.1–0.8 vol. %), the flue gas from the regeneration zone in accordance with the present invention generally contains less than about 0.5, preferably less than 0.2, more preferably less than 0.1, still more preferably less than 0.05 vol. %, most preferably less than 0.02 vol. % carbon monoxide. Typically, the carbon monoxide content will range from about 5 to about 1000 ppm; preferably from about 300 to about 1000 ppm, and most preferably from about 5 to about 500 ppm. For the practice of this invention, the free oxygen content in the flue gas should be maintained at least 0.1 vol. %, preferably at least 0.4 vol. % and more preferably at least 0.8 vol. %. Typically, the oxygen content may vary from about 0.4 to about 7 vol. %, preferably from about 0.8 to about 5 vol. %, more preferably from about 1 to about 3 vol. %, most preferably from about 0.1 to about 2 vol. %. From an ecological viewpoint, an extremely low level of carbon monoxide in the flue gas stream is highly desirable and meets existing standard for ambient air quality. From a process viewpoint, heat recovery by down stream combustion of carbon monoxide in a boiler is avoided with consequent substantial savings in process equipment and operational cost.

Further, the method for regenerating catalytic cracking catalyst may be applied beneficially to any type of fluid cat cracking unit with little or no modifications and without limitations as to the spatial arrangement of the reaction, stripping, and regeneration zones thereof. The regeneration zone of a catalytic cracking unit can be designed independently from the reaction zone since the regeneration zone merely receives spent catalyst, oxidizes the coke thereon to regenerate the catalyst, and returns the regenerated catalyst to the reaction zone. Therefore, the reaction zone can be a pure transfer line, i.e., one in which the reaction occurs in a single pipe type vessel directly terminating in a rough cut cyclone or cyclones, a conventional dilute riser/dense bed combination, or a dense bed alone.

Lower temperatures in the regeneration zone, for example temperatures below about 1300° F., are particularly desirable in pure transfer line units since the circulation rate of the catalyst is a major factor in providing the severity of cracking conditions to the cracking reaction. The greater the circulation rate, the greater the holdup in the reaction zone. A lower temperature in the regeneration zone will increase catalyst circulation rate, thereby permitting greater conversion in the riser and/or cracking at lower temperatures in the reaction zone and production of less gas or more liquid product at a given level of conversion.

What is claimed is:

1. In a fluidized catalytic cracking process comprising contacting a hydrocarbon feedstock with cracking catalyst in a reaction zone under cracking conditions to produce cracked hydrocarbon vapors and coke contaminated catalyst, wherein said coke contaminated catalyst is regenerated in a regeneration zone at elevated temperature with an oxygen-containing regeneration gas, the catalyst in the regeneration zone being fluidized by the upward flow of the regeneration gas to form a dense phase catalyst bed and a dilute catalyst phase, the improvement which comprises regenerating the coke contaminated catalyst according to the following steps, all of which are accomplished at a substantially constant regeneration gas rate;
   (a) increasing the temperature of the dense phase catalyst bed to a level ranging from about 1250° to about 1450° F. so as to increase the rate of conversion of coke to carbon monoxide and carbon dioxide, said temperature increase being effected while reducing the coke make in the reaction zone;
   (b) further reducing the coke make in the reaction zone while maintaining the temperature of the dense phase bed substantially that of step (a) for a time sufficient to maintain an oxygen concentration in the substantially catalyst-free flue gas of at least 0.1 vol. % to burn at least an additional portion of coke from the coke contaminated catalyst to obtain in the regeneration zone a regenerated catalyst having a residual carbon content of less than about 0.2 wt. % and a substantially catalyst-free flue gas containing less than about 0.5 vol. % of carbon monoxide; and
   (c) reducing the temperature of the dense phase catalyst bed to a level ranging from about 10° to about 130° F. below that employed in step (b) in order to maintain the carbon monoxide content in the substantially catalyst-free flue gas at no greater level than that obtained in step (b), steps (a), (b) and (c) being effected while maintaining the temperature of the dilute catalyst phase at least that of the dense phase catalyst bed and within the range of from about 1250° to 1450° F. so as to avoid excessive afterburning in that portion of the regeneration zone wherein the flue gas is substantially catalyst free.

2. The method of claim 1 wherein the coke make in the reaction zone of step (b) is reduced to a level sufficient to maintain an oxygen concentration in a substantially catalyst-free flue gas of at least 0.4 vol. %.

3. The method of claim 1 wherein the oxygen-containing regeneration gas comprises air.

4. The method of claim 1 wherein the temperature of the dense phase bed in step (a) is increased to a level ranging from about 1250° to about 1400° F.

5. The method of claim 1 wherein steam is injected into that portion of the regeneration zone wherein the flue gas is substantially catalyst-free to inhibit the oxidation of carbon monoxide to carbon dioxide in said portion of the regeneration zone.

6. The method of claim 1 wherein the coke make in the reaction zone of steps (b) and (c) is reduced to a level sufficient to maintain an oxygen concentration in a substantially catalyst-free flue gas of from about 0.4 to about 7 vol. %.

7. The method of claim 1 wherein the carbon monoxide content of the substantially catalyst-free flue gas is less than about 0.2 vol. %.

8. The method of claim 7 wherein the residual carbon on regenerated catalyst ranges from about 0.01 to about 0.1 wt. %.

9. The method of claim 1 wherein the cracking catalyst comprises silica and alumina together with a crystalline aluminosilicate.

10. The process of claim 1 wherein the temperature of the dense phase catalyst bed in step (c) is reduced to a level ranging from about 20° to about 100° F. below that employed in step (b).

11. In a fluidized catalytic cracking process comprising contacting a hydrocarbon feedstock with cracking catalyst in a reaction zone under cracking conditions to produce cracked hydrocarbon vapors and coke contaminated catalyst, wherein said coke contaminated catalyst is separated from the effluent from the reaction zone and stripped of volatile petroleum components and then added to a regeneration zone at elevated temperatures with an oxygen-containing regeneration gas, the catalyst in the regeneration zone being fluidized by the upward flow of the regeneration gas to form a dense phase catalyst bed and a dilute catalyst phase, the improvement which comprises regenerating the coke contaminated catalyst according to the following steps, all of which are accomplished at a substantially constant regeneration gas rate:
   (a) increasing the temperature of the dense phase catalyst bed to a level ranging from about 1250° to about 1450° F. so as to increase the rate of conversion of coke to carbon monoxide and carbon dioxide, said temperature increase being effected while reducing the coke make in the regeneration zone;
   (b) further reducing the coke make in the reaction zone while maintaining the temperature of the dense phase bed substantially that of step (a) for a time sufficient to effect an oxygen concentration in the substantially catalyst-free flue gas of from about 0.4 to about 7 vol. % to burn at least an additional portion of coke from the coke contaminated catalyst to obtain in the regeneration zone a regenerated catalyst having a residual carbon content of less than 0.1 wt. % and a substantially catalyst-free flue gas containing less than 0.2 vol. % of carbon monoxide, and (c) reducing the temperature of the dense phase catalyst bed to a level ranging from about 20° to about 100° F below that employed in step (b) in order to maintain the carbon monoxide content in the substantially catalyst-free flue gas at no greater level than that obtained in step (b), steps (a), (b) and (c) being effected while maintaining the temperature of the dilute catalyst phase at least that of the dense phase catalyst bed and within the range of from about 1260° to about 1420° F so that the temperature in that portion of the regeneration zone wherein the flue gas is substantially catalyst-free is no more than about 30° F above the temperature in the dilute catalyst phase.

12. The method of claim 11 wherein steam is injected into that portion of the regeneration zone wherein the flue gas is substantially catalyst-free to further reduce the temperture and inhibit the oxidation of carbon monoxide to carbon dioxide in said portion of the regeneration zone.

13. The method of claim 11 wherein the coke made in the reaction zone of step (c) is reduced to a level sufficient to maintain an oxygen concentration in a substantially catalyst-free gas from about 0.8 to about 5 vol. %.

14. The method of claim 11 wherein the residual carbon on regenerated catalyst ranges from about 0.01 to about 0.05 wt. %.

15. The method of claim 11 wherein the carbon monoxide content in the substantially catalyst-free flue gas is less than 0.05 vol. %.

16. The method of claim 11 wherein the dense phase catalyst bed temperature is controlled by varying the catalyst circulation rate.

17. The method of claim 11 wherein the regenerated catalyst is recycled to the reaction zone.

* * * * *